UNITED STATES PATENT OFFICE.

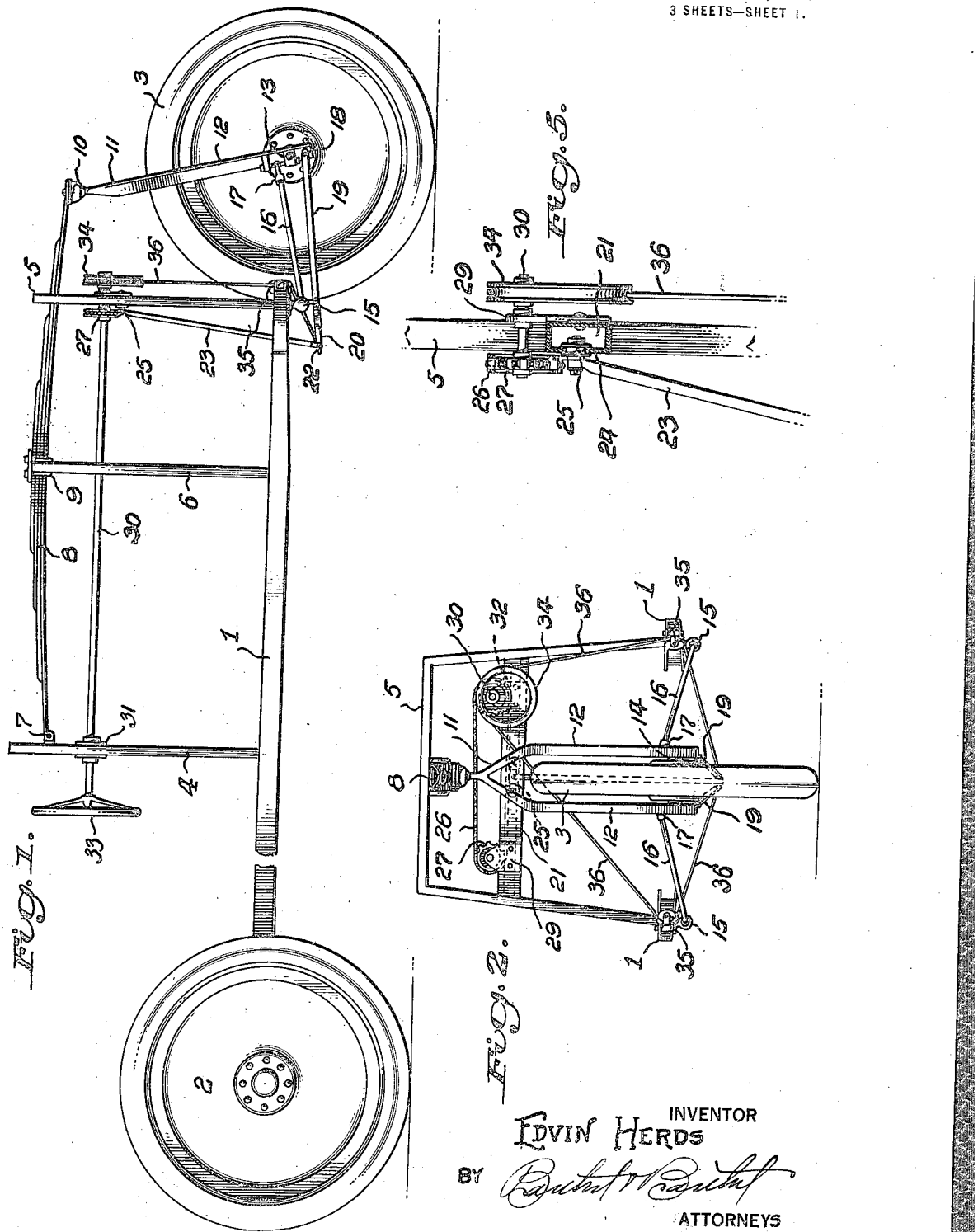

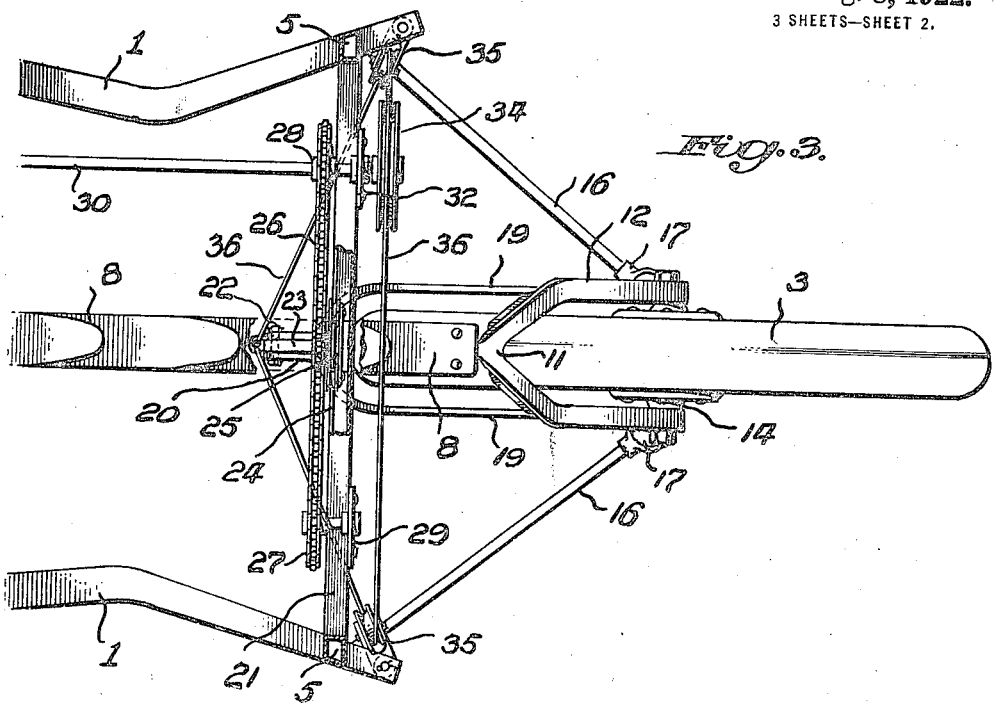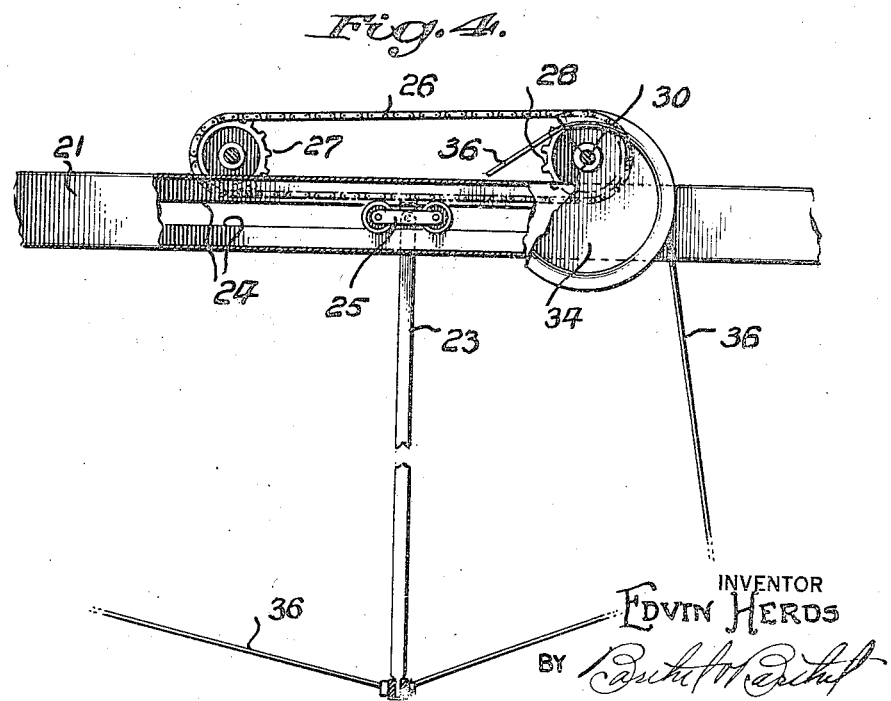

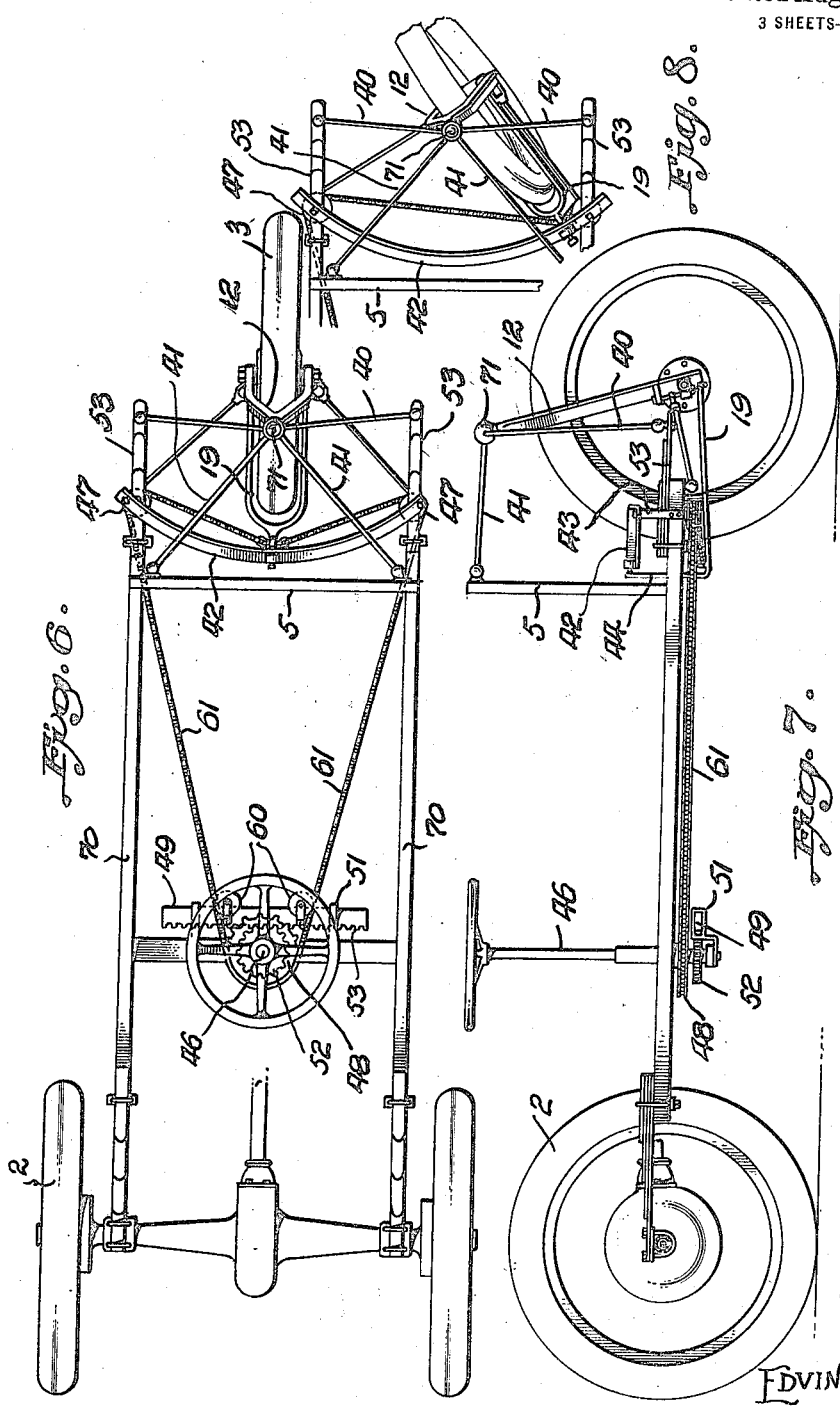

EDVIN HERDS, OF DETROIT, MICHIGAN.

TRICYCLE OR THREE-WHEEL MOTOR VEHICLE.

1,424,822.  Specification of Letters Patent.  Patented Aug. 8, 1922.

Application filed December 27, 1920. Serial No. 433,239.

*To all whom it may concern:*

Be it known that I, EDVIN HERDS, a citizen of the United States of America, residing at Detroit, in the county of Wayne and State of Michigan, have invented certain new and useful Improvements in Tricycles or Three-Wheel Motor Vehicles, of which the following is a specification, reference being had therein to the accompanying drawings.

This invention relates to a motor tricycle, or three wheel vehicle, and has special reference to the supporting and steering of the forward end of a vehicle by a single wheel. In using the term "vehicle" hereinafter it is to be understood that the principle involved in this invention is applicable to any wheeled structure whether the same is in the form of a toy, power skate, pleasure or commercial car, with or without a source of power, but preferably of that type that may be driven by motor power.

The primary object of my invention is to furnish the front end of a vehicle with single supporting and steering wheel, so flexibly attached as to require no heavy parts, and at the same time attain greater amount of safety and comfort for the occupants of the vehicle than is now obtainable in the vehicles of similar nature.

Another object of my invention is to obtain the necessary stabilizing effect for vehicles of this kind, when driven along a curved section of a road or rounding street corners. This stabilizing effect I have obtained by holding the front wheel between two laterally swinging radius rods, which automatically shift the center of weight of the vehicle towards the inner side of the curve in which the vehicle moves, as described hereafter.

A further object of my invention is to obtain a positive steering control through a secondary horizontally placed steering fork, by which the front wheel can be easily controlled during the operation of the vehicle.

With such ends in view my invention resides in the novel construction to be hereinafter described and then claimed. Reference will now be had to the drawings, wherein Figure 1 is a side elevation of a portion of a vehicle having the front end thereof constructed in accordance with my invention;

Fig. 2 is a view of the front end of the vehicle;

Fig. 3 is an enlarged plan of the forward end of the vehicle, partly broken away and partly in section;

Fig. 4 is an enlarged cross sectional view of a portion of the vehicle showing part of the steering mechanism;

Fig. 5 is a longitudinal sectional view of the same;

Fig. 6 is a plan of another form of vehicle;

Fig. 7 is a side elevation of the same, and

Fig. 8 is a plan of a portion of the vehicle shown in Fig. 7, illustrating the steering wheel in a turned position.

In describing my invention by aid of the views above referred to, I desire to point out that the same are intended as merely illustrative as a preferred embodiment of my invention, and I do not care to confine my invention to the precise construction and arrangement of parts, other than defined by the appended claims.

In the drawings there is shown a portion of a vehicle chassis which may include side frames 1 having the rear ends thereof, supported for movement over the ground by wheels 2, and a front steering wheel 3 is adapted to support the forward end of the chassis, said wheel being placed in the medial plane of the vehicle. The wheels are of a conventional form and as approaching an ordinary and well known type of motor driven vehicle, the chassis frames 1 support a dash 4, a front end bearing 5 and intermediate bearing 6, said bearings being in the form of inverted U-shaped frames or bridge members which in motor driven vehicles will provide clearance for a power plant, radiator and other equipment.

Suitably attached to the dash 4, as at 7 is a fork suspension member 8 which is preferably in the form of a long leaf or laminated spring having its central portion attached to the intermediate bearings 6 by U bolts 9, clevises or other fastening means. The forward end of the fork suspension member extends under the front end bearing 5 which is constructed so high that it cannot limit the action of said suspension member or spring 8. Attached to the forward end of the member 8, by a ball and socket connection 10 or a conventional form of universal joint is a depending front wheel fork 11 inclined with its lower end in advance of its upper end so that any end thrust on the lower end of the fork will to a certain degree be transferred to the fork suspension member. The fork 11 may have its side arms 12 of any desired cross sectional shape and at the lower ends of said arms are journal boxes or bearings 13 for the axle 14 of the wheel 3.

The forward ends of the chassis frame 1 are preferably bent outwardly in lateral planes, as best shown in Fig. 3 and suitably connected to the forward ends of said frames are ball and socket connections 15 for radius rods 16 which converge inwardly with the forward ends thereof universally connected to the lower ends of the fork arms 12, as at 17 so that the wheel fork 11 may have vertical and lateral movement relative to the forward end of the chassis.

Pivotally connected to the lower ends of the fork arms 12, as at 18, so as to permit of vertical movement of the wheel fork, are the forward ends of the steering fork 19, which extends rearwardly and has its crown end 20 behind the wheel 3, and pivotally connected, as at 22, to the lower end of a compensating or equalizing member 23, which extends upwardly at the rear of the front end bearing 5. On the front end bearing 5 is a transverse member or rail 21 which is preferably in the form of a channel or slotted hollow member affording transverse opposed rails 24 for a carriage 25 to which is attached the upper end of the equalizing member 23. The carriage 25 may take the form of a set of grooved rollers between the rails 24 so that the carriage cannot become accidentally displaced during its reciprocable movement in the transverse member 21, and said carriage is free to move under the influence of the equalizing member 23 connected to the rear end of the steering fork 19. The movement of the carriage, however, is governed by an endless sprocket chain 26 or other power transmission member, trained about sprocket wheels 27 and 28. The sprocket wheel 27 is journaled in a bearing 29 mounted on the transverse member 21 adjacent one side of the front end bearing 5, and the sprocket wheel 28 is mounted on a longitudinal steering shaft 30 journaled in bearings 31 and 32 of the dash 4 and the front end bearing 5 respectively. The bearings 31 and 32 longitudinally aline and the rear end of the steering shaft 30 has a conventional form of steering wheel 33 which may be operated by an occupant of the vehicle.

On the forward end of the steering shaft 30 is an eccentrically disposed grooved sheave 34 which is in the same vertical transverse plane as small grooved sheaves 35 swiveled at the forward ends of the frames 1, as best shown in Figs. 2 and 3. Trained over the sheaves 34 and 35 is a cable or flexible member 36 having its ends attached to the rear end of the steering fork 19. The cable or flexible member 36 is maintained taut by the eccentric relation of the sheave 34 to its supporting shaft 30, and with the steering wheel 3 in its normal or straight ahead position the cable 36 is supported on the sheave 34 with the short radius or fall of the eccentric sheave uppermost, and when the eccentric sheave 34 is rotated clockwise or counter clockwise, the long radius or rise of the eccentric sheave in ascending pulls one way or the other on the cable and consequently the rear end of the steering fork 19 is swung in an arc with the steering wheel as the center of such arc. It is now obvious that the steering wheel may be turned for vehicular movement to the right or left, and with the equalizing member 23 maintaining the rear end of the fork 19 constantly in a horizontal plane or defined relation to the transverse member 21, the cable 36 will be maintained taut and thus cooperate with the radius rods 16 in lending stability to the steering fork during adjustment thereof. Since movement is imparted to the carriage 25 in synchronism with the sheave 34, it is obvious that the rear end of the fork 19 will be carried in the desired direction corresponding to the cable 36, and of course the radius rods 16 having universal joints at both ends permit such steering movement of the wheel fork 11. It will be seen that since the wheel fork 11 is definitely poised between the forward converging radius rods 16, the turning of said wheel fork causes a lateral movement to the forward ends of said radius rods, and at the same time to the lower end of said wheel fork and the wheel itself. This lateral movement is readily understood, if the rear end of the steering fork 19, is pulled to the right by cable 36, the forward end of left radius rod will be turned towards the center of the vehicle, at the same time the forward end of the right radius rod will be pushed to the right and away from the center of the vehicle, with the attached lower end of the wheel fork and the wheel. Turning the rear end of said steering fork to the left the operation will be reversed. Turning the rear end of said steering fork 19 causes the vehicle to turn to the left and vice versa. In every case the center of gravity of the vehicle is shifted towards the center of the curve in which the vehicle is moving, in relation to the points of contact that the wheels have with the ground. This constitutes a very desirable stabilizing effect for the vehicle, which is heightened by the fact that the upper end of the wheel fork 11, is not shifted laterally and thus causes the lower end thereof, and with it the wheel, to laterally incline against the outer periphery of the curve in which the vehicle may be moving. This feature prevents in a large measure the accidental turning over of the vehicle, when traveling at high speed along a curved section of a road, besides allowing a lighter construction than would be otherwise possible.

Furthermore the equalizing member 23 in maintaining a defined relation between the rear end of the steering fork 19 and the steering shaft 30 maintains the cable 36 taut during any vertical movement of the wheel fork 11, which will be incurred when the wheel 3 encounters irregular ground or obstructions. The pivotal connections of the steering fork 19 with the wheel fork 11 and the universal connections between the radius rods 16 and the wheel fork 11 permit of vertical movement of the wheel fork 11 so that the suspension member 8 may cushion upward thrust of the steering wheel. It is in this connection that the radius rod 16 will cooperate with the suspension member 8 in receiving end or impact thrust of the steering wheel.

I may, however, vary the other parts of construction without effecting these essentials.

For example I may use a different spring suspension, by employing two springs 53 extending forward from side members 70 of the vehicle shown in Fig. 6, and then have a yoke 40 fastened to the ends of these springs and attached by a ball and socket joint 71 to the upper end of the vertical fork 12. The springs 53 yielding about equal, the yoke 40 would have a tendency to hold the upper end of said vertical fork 12 to the central medial plane of the car, but to prevent the forward and backward motion, I employ distance members 41, extending from the upper end of the fork 12 back to the top of radiator or front bearing 5.

I may also employ another means of supporting the crown end of the horizontal fork 19 by constructing a curved track 42 from one side of the car to the other, along the arc taken by the crown of said fork. I prefer to have the track 42 raised above the side frame members 70 so as not to be caught by snow, dirt or obstructions on road. For this purpose, I use two posts 43, one on each side member 70 of the vehicle and bolted or otherwise secured thereto, and the ends of said track 42 are fastened to said post. As it may not be convenient in this case to lift the crown end of the horizontal fork so high, I have an extension 44 of the crown end of the said fork bend upward at the level of said track 42 and then forward over the track to support a small roller on the track. I may also employ a vertical steering shaft 46 as shown in Figs. 6 and 7; attach a sprocket wheel 48 on its lower end and have a sprocket chain 49, from the crown of horizontal fork 19, extend around a grooved pulley 47 at the front end of one of the frames 70, then around the sprocket wheel 48 at the lower end of steering shaft 46, and around another pulley 47 on other frame 70 and back to crown end of said horizontal fork 19.

To equalize the tension of the chain 49, when the front wheel 3 is turned to right or left, I may use a slide 49 which can move on brackets 51 fastened to car floor. This slide has two grooved rollers 60 barely touching the sprocket chain 49 when the steering fork is in central position. But the lower end of the steering shaft 46 has a toothed wheel 52 engaging a toothed rack 53 on side of the slide 49 nearest to the steering shaft 46. Now, when the steering shaft 46 is rotated, while turning around a corner or curved track, either one of the rollers 60 will begin to push the sprocket chain 49 and take up the slack resulting from the crown end of steering fork 19 having been shifted to one side.

What I claim is:—

1. In a vehicle having a chassis and a single supporting and steering wheel in front, the combination of a vehicle supporting fork for the wheel, a steering fork for the wheel at approximately right angle to said supporting fork and extending horizontally rearward from the hub portion of said wheel, two radius rods with universal joints at both ends holding the lower end of said supporting fork relative to said chassis, and means connected to the rear end of the steering fork adapted to move it in a horizontal plane.

2. A vehicle as characterized in claim 1, wherein the upper end of the supporting fork is universally held relative to said chassis so as to allow lateral movement to the lower end of said fork.

3. In a vehicle having a chassis with single front steering wheel, a fork for such a wheel having its upper end yieldably and universally held from said chassis, two radius rods with universal joints at their both ends articulating the lower end of said wheel fork to said chassis, a steering fork squarely disposed to said wheel fork and extending rearwards under said chassis.

4. A vehicle comprising a chassis, two wheels supporting the rear end thereof, a single wheel supporting the front, a spring suspension member above said chassis, a wheel fork holding the front wheel and having its upper end universally held by said spring suspension member, and its lower end universally held by two radius rods, said radius rods having universal joints at both ends, a steering fork disposed at right angles to said wheel fork articulating said wheel fork between said radius rods.

5. In a vehicle having a single supporting and steering wheel in front, a supporting fork for the wheel, said fork having its crown end over the wheel, a steering fork for the wheel having its crown end behind the wheel and squarely disposed to said supporting fork, two radius rods with universal joints at their both ends articulating the lower end of said supporting fork relative to the vehicle, and laterally disposed means adapted for shifting the crown end of the steering fork.

6. A vehicle as characterized in claim 5, wherein the upper end of said supporting fork is universally and yieldingly held by an overhanging spring suspension member so as to allow lateral movement to the lower end of said fork.

7. In a vehicle having a chassis, a front steering wheel, a vertically disposed supporting fork for the wheel, an overhanging spring suspension member universally holding the upper end of said supporting fork, the lower end of said supporting fork having universal connections to the sides of the chassis by two radius rods, a steering fork at right angles to said supporting fork articulating said supporting fork between said two radius rods.

8. In a vehicle comprising a chassis with single supporting and steering wheel in front thereof, a wheel fork for said steering wheel having its upper end held yieldably and universally by an overhanging spring suspension member and its lower end held in a given horizontal plane by two radius rods universally jointed to the sides of the chassis and to the sides of said wheel fork respectively, a steering fork disposed at right angles and jointed vertically yieldingly to said wheel fork adapted for turning the said wheel fork between said radius rods.

9. In a vehicle whose front end is supported by a single wheel the combination of an approximately vertical wheel fork, an approximately horizontal steering fork, an overhanging spring suspension member holding the upper end of said wheel fork by a universal joint, two radius rods with universal joints at both ends universally holding the lower end of said wheel fork relative to the vehicle.

10. A vehicle as characterized in claim 9, wherein the horizontally disposed steering fork, and a flexible member attached to the rear end of said steering fork adapted for shifting said rear end laterally for steering purposes.

11. In a vehicle having a chassis with side members, a single supporting and steering wheel in the front thereof, the combination of a vehicle supporting fork, a spring suspension member universally holding the upper end of said fork, a steering fork at right angles to said supporting fork and having vertically yielding connection therewith, two radius rods universally supported and universally holding the lower end of said supporting fork relative to the sides of the chassis.

12. A vehicle as characterized in claim 11, wherein the steering fork extends rearwardly under the chassis and has a flexible member attached thereto adapted for shifting the rear end of said steering fork laterally.

13. In a vehicle having a chassis with spring suspension member disposed over the chassis, a steering wheel, a fork for such wheel, having its upper end yieldably and universally held by said spring suspension member, said fork having its lower end universally connected to said chassis by two radius rods with universal joints at both ends, a steering fork horizontally and squarely disposed and vertically yieldingly connected to said wheel fork adapted for turning said wheel fork.

14. A vehicle as characterized in claim 13, wherein the rear end of the horizontally disposed steering fork has separate means for support and adapted for lateral shifting for steering purposes.

15. A vehicle having a chassis, a steering wheel, a steering fork for the wheel extending rearwardly behind the wheel, an equalizing member connected to the rear end of said fork and having the upper end thereof movably supported by said chassis, and means including flexible members adapted for simultaneously moving said fork and the upper end of said equalizing member.

16. A vehicle as characterized in claim 15, wherein said means includes a steering shaft and a flexible member driven from said shaft.

17. In a vehicle having two squarely disposed forks for a single front steering wheel, flexible member for shifting the horizontally disposed steering fork, a steering shaft with means for imparting movement to said flexible member and holding said member taut.

18. A vehicle characterized as in claim 17, wherein said means includes an eccentrically disposed wheel on said steering shaft, or a sliding rack connected to said shaft.

19. In a vehicle wherein a chassis has its forward end solely supported by a single steering wheel;—means for steering such wheel, said means including a fork having its crown end below the horizontal central plane of said wheel, means at opposite sides of said fork and connected to the crown end of said fork for shifting the crown end of said fork in a lateral plane, and equalizing means connected to the crown end of said fork, said equalizing means being movable transversely of the chassis and preventing vertical displacement of the crown end of said fork.

20. In a vehicle having a chassis, a single steering wheel having a fork, a universal connection between the fork of said wheel and the chassis of the vehicle, and radius rods having the rear ends thereof universally connected to the sides of said chassis and the forward ends universally held at the sides of said wheel.

In testimony whereof I affix my signature in presence of two witnesses.

EDVIN HERDS.

Witnesses:
ANNA M. DORR,
KARL H. BUTLER.